United States Patent
Bay et al.

(10) Patent No.: US 12,552,026 B2
(45) Date of Patent: Feb. 17, 2026

(54) AUTOMATIC QUALITY ASSESSMENT OF TASKS

(71) Applicant: ZEBRA TECHNOLOGIES CORPORATION, Lincolnshire, IL (US)

(72) Inventors: Alessandro Bay, London (GB); Andrea Mirabile, London (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 380 days.

(21) Appl. No.: 17/992,742

(22) Filed: Nov. 22, 2022

(65) Prior Publication Data

US 2024/0165803 A1    May 23, 2024

(51) Int. Cl.
*B25J 9/16*           (2006.01)
*G05B 19/4155*        (2006.01)

(52) U.S. Cl.
CPC .......... *B25J 9/1661* (2013.01); *B25J 9/1682* (2013.01); *G05B 19/4155* (2013.01); *G05B 2219/50391* (2013.01)

(58) Field of Classification Search
CPC ...... B25J 9/1661; B25J 9/1682; B25J 9/1679; G05B 19/4155; G05B 2219/50391; G06Q 10/06316
See application file for complete search history.

(56) References Cited

U.S. PATENT DOCUMENTS

| | | | | |
|---|---|---|---|---|
| 5,974,392 A | * | 10/1999 | Endo | G06Q 10/06398 705/7.14 |
| 9,561,590 B1 | * | 2/2017 | Nusser | B25J 9/1661 |
| 2010/0148919 A1 | * | 6/2010 | Roberts | G07C 3/00 340/5.2 |
| 2011/0288667 A1 | * | 11/2011 | Noda | G05B 19/42 700/98 |

(Continued)

FOREIGN PATENT DOCUMENTS

| | | | | |
|---|---|---|---|---|
| CN | 107730103 A | * | 2/2018 | ....... G06Q 10/06316 |
| CN | 114693134 A | * | 7/2022 | |

(Continued)

OTHER PUBLICATIONS

CN-107730103-A translation (Year: 2018).*
CN-114693134-A translation (Year: 2022).*
CN-118848998-A translation (Year: 2024).*

*Primary Examiner* — Kyle T Johnson

(57) ABSTRACT

Disclosed is a robot management system comprising a control circuit configured to receive data indicative of a worker task being completed by a human from a human task management system coupled to the robot management system, generate a new robot task based on the data, add the new robot task to a robot task queue, detect an available robot, determine capabilities of the available robot, and filter the robot task queue based on the capabilities of the available robot to generate a group of robot tasks, the group being a subset of the robot task queue and each task in the group can be performed by the available robot. The control circuit (Continued)

is further configured to determine a priority group comprising a priority for the available robot for each task in the group and assign a robot task from the group to the available robot based on the priority group.

20 Claims, 8 Drawing Sheets

(56) References Cited

U.S. PATENT DOCUMENTS

| | | | | |
|---|---|---|---|---|
| 2015/0094851 | A1* | 4/2015 | Kawabe | B25J 11/0005 |
| | | | | 901/1 |
| 2015/0352719 | A1* | 12/2015 | Nakazato | G05B 19/4183 |
| | | | | 700/253 |
| 2018/0326583 | A1* | 11/2018 | Baroudi | B25J 9/1661 |
| 2019/0180218 | A1* | 6/2019 | Vigneswaran | G06Q 10/0633 |
| 2020/0103857 | A1* | 4/2020 | Wynne | G05B 19/4099 |
| 2020/0262650 | A1* | 8/2020 | Agarwal | B65G 1/1373 |
| 2020/0302391 | A1* | 9/2020 | Li | G06Q 10/0875 |
| 2021/0053221 | A1* | 2/2021 | Jagannath | G06N 3/08 |
| 2021/0173377 | A1* | 6/2021 | Laftchiev | G05B 13/0265 |
| 2021/0213620 | A1* | 7/2021 | Silverstein | G06T 19/006 |
| 2022/0019974 | A1* | 1/2022 | Park | G06Q 10/103 |
| 2022/0048186 | A1* | 2/2022 | Sharma | G06F 11/3006 |
| 2022/0100184 | A1* | 3/2022 | Natarajan | G06N 3/0499 |
| 2022/0339785 | A1* | 10/2022 | Larose | B25J 9/1653 |
| 2023/0222454 | A1* | 7/2023 | Cella | G06N 7/01 |
| | | | | 705/28 |
| 2024/0165803 | A1* | 5/2024 | Bay | B25J 9/1682 |

FOREIGN PATENT DOCUMENTS

| | | | | |
|---|---|---|---|---|
| CN | 118848998 A | * | 10/2024 | B25J 9/0081 |
| WO | WO-2022201067 A1 | * | 8/2022 | B65G 1/0492 |

* cited by examiner

AUTOMATIC QUALITY ASSESSMENT OF TASKS

BACKGROUND

The present disclosure relates to a quality assessment of human performed tasks. Human task management systems are designed to provide tasks to multiple workers in a facility and the workers complete these tasks throughout the facility.

BRIEF DESCRIPTION OF THE SEVERAL VIEWS OF THE DRAWINGS

The accompanying figures, together with the detailed description below, are incorporated in and form part of the specification, and serve to further illustrate embodiments of concepts that include the claimed invention, and explain various principles and advantages of those embodiments.

Figure 1:
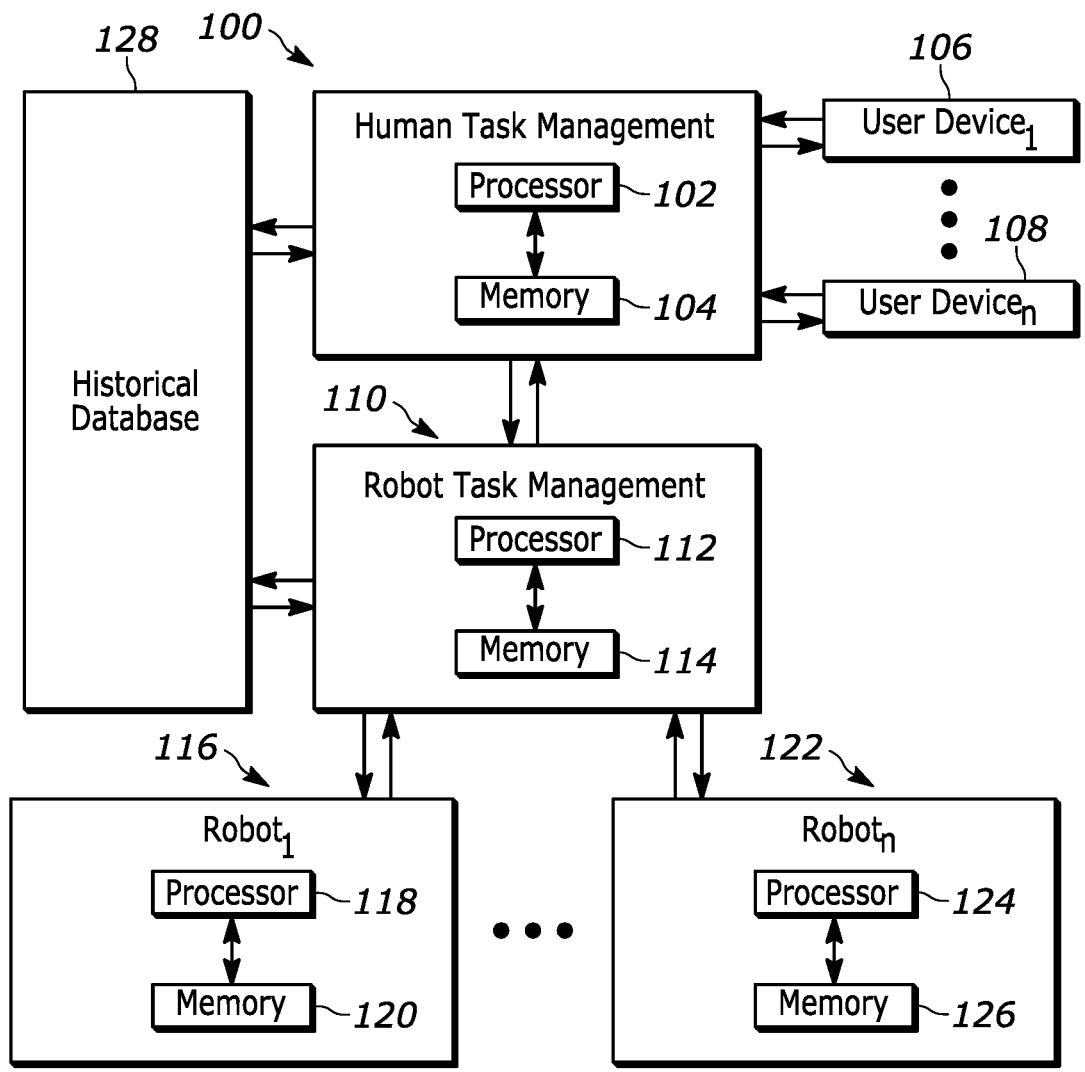
FIG. 1 is a block diagram illustrating a system for assigning a task to a robot, according to at least one aspect of the present disclosure.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Human operators can perform many tasks, or actions, in a facility one after the other, during a shift. Often, there is insufficient time or other available operators to determine whether these tasks were performed successfully and to a degree of quality required.

One solution to this issue is a system that can utilize available robots in the facility to automatically check and determine the quality of a human completed task and provide feedback or raise another human operator task to fix any unresolved issues. For example, a robot can be performing its tasks and can be assigned a quality assessment task to add to its task queue to be completed at an appropriate time in its task list. In one aspect, an appropriate time is a time after the tasks of the robot have been completed. In another aspect, an appropriate time is during the completion of another task. For example, a robot can be completing a first task, e.g. moving a pallet, that through the completion of the first task, the robot is located near a quality assessment task. The robot can then stop the first task, complete the quality assessment task, and then continue the first task.

For example, an autonomous mobile robot (AMR) completing a quality assessment task may navigate to a position to complete the task, record data indicative of the quality of the task, for example an image from a field of view (FOV), and provide the data to a person or an analysis subsystem to assess the quality of the human completed task. For example, in response to an assembly task, the autonomous mobile robot can capture an image of an assembled component and a machine vision system can confirm the screws have been properly inserted. In another example, in response to a picking task, the autonomous mobile robot can capture an image of a picking bin and a scanning system can confirm that SKUs associated with an order have been placed in the bin. While these examples relate to quality assessment jobs, other job types may also be assigned, such as maintenance inspection, checking for in-stock inventory, monitoring high value assets or theft-prone items, searching for trapped or injured workers in response to an alarm or emergency, etc.

Examples disclosed herein are directed to a robot management system. The robot management system comprising a control circuit configured to receive first data indicative of a worker task being completed by a human from a human task management system coupled to the robot management system, generate a new robot task based on the first data, and add the new robot task to a robot task queue. The control circuit is further configured to detect a first available robot, determine capabilities of the first available robot, and filter the robot task queue based on the capabilities of the first available robot to generate a first group of robot tasks. The first group being a subset of the robot task queue and each task in the first group can be performed by the first available robot. The control circuit is further configured to determine a first priority group comprising a priority for the first available robot for each task in the first group and assign a robot task from the first group to the first available robot based on the first priority group.

Additional examples disclosed herein are directed to a non-transitory computer readable medium storing computer readable instructions which, when executed cause a machine to receive first data indicative of a human worker completing a worker task, generate a new robot task based on the first data, add the new robot task to a robot task queue, detect an available robot, determine capabilities of the available robot, and filter the robot task queue based on the capabilities of the available robot to generate a group of robot tasks. The group of robot tasks being a subset of the robot task queue and each task in the group of robot tasks can be performed by the available robot. The non-transitory computer readable medium storing further computer readable instructions which, when executed cause the machine to determine a priority group for the available robot for each task in the group of robot tasks and assign a robot task from group of robot tasks to the available robot based on the priority group.

Additional examples disclosed herein are directed to a robot management system. The robot management system comprising a control circuit configured to receive first data indicative of a worker task being completed by a human worker from a human task management system coupled to the robot management system, generate a new robot task based on the first data, and add the new robot task to a robot task queue. The control circuit further configured to determine a task to assign, determine the robot capabilities required to perform the task, and filter the robots in the facility based on the required capabilities to determine a group of robots that can perform the task. The group of robots being a subset of the robots in the facility. The control circuit further configured to determine a priority group comprising a priority for the task for each robot in the group of robots and assign a robot from the group of robots the task based on the priority group.

The systems and methods of the present disclosure provide several benefits and advantages. For example, human quality assessment is manual, subject to human error and can be time intensive and/or cost-prohibitive. The systems and methods of the present disclosure provide for a robot to automatically perform a quality assessment task in a time and cost-efficient manner via at least one workflow trigger allowing for a greater quantity of performed quality assessment tasks. As such, robot quality assessment can yield efficiencies including, but not limited to, improvement in human operator performance and quality control. In addition, these workflow triggers improve robot utilization by assigning a task to a robot that would otherwise be idle.

For example, a "task orchestration module" can take a workflow trigger and coordinate activities of robots based on tasks completed by human workers. The task orchestration module may be part of a robot task management system, a human task management system, a standalone system, or two or more of these modules may be combined into a single system.

FIG. 1 is a block diagram illustrating a system for assigning a task to a robot, according to at least one aspect of the present disclosure. The human task management (HTM) system includes a processor 102 that is coupled to a memory 104 to form a HTM control circuit 100. The HTM control circuit 100 executes instructions to perform various processes related to the management of tasks performed by human workers. In at least one aspect, the HTM control circuit 100 executes a process that generates tasks for human workers, transmits the tasks to the workers, receives completion events when the tasks are completed, and performs other actions as needed to facilitate the management of tasks for the human workers. In various aspects, the HTM control circuit 100 includes multiple processors and/or memories.

The HTM control circuit 100 is coupled to multiple user devices 106, 108 having graphical user interfaces (GUI). The user device 106, 108 can be a mobile device including, but not limited to, a tablet, mobile computer, and smartphone. A human operator can utilize the user device 106, 108 to view received tasks and report the completion thereof. For example, a human operator can receive task assignments on the user device 106, complete a first task of the task assignments, and report the first task as completed on the user device 106, 108. The user device 106, 108 can then transmit a task completion event to the HTM control circuit 100.

The HTM control circuit 100 is coupled to a historical database 128. The historical database 128 can be stored on a memory located remotely to the facility or within the facility. In at least one aspect, the historical database 128 stores data from multiple facilities. Upon the HTM control circuit 100 receiving the task completion event, the HTM control circuit 100 can store the task completion event and associated data on the historical database 128. In one aspect, the task completion event includes a worker task ID and a worker ID for the worker that completed the task. In one aspect, the associated data includes information relevant to the task completed by the worker. In at least one aspect, the associated data includes a location or zone in the facility where the task was completed, an importance associated with the task, a worker task type, a difficulty rating associated with the task or the worker task type, and historical data indicating a success rate regarding tasks of that type by that worker. For example, the HTM control circuit 100 can search the historical database 128 for completion events based on the task type and the worker ID and use that information to generate a success rate of the worker based on the task type, which can then be stored in the historical database 128.

The HTM control circuit 100 is also coupled to a robot task management (RTM) control circuit 110. A RTM system includes a processor 112 that is coupled to a memory 114 to form the RTM control circuit 110. The HTM control circuit 100 transmits the task completion event to the RTM control circuit 110. The RTM control circuit 110 executes instructions to perform various processes related to the management of tasks performed by robots. In at least one aspect, the RTM control circuit 110 executes a process that generates tasks for robots to complete, assigns the tasks to robots, receives completion events for the tasks, and performs other actions as needed to manage the robots. In various aspects, the RTM control circuit 110 includes multiple processors and/or memories.

The RTM control circuit 110 is coupled to the historical database 128. In at least one aspect, the RTM control circuit 110 accesses the historical database 128 to generate a new robot task associated with the task completion event from the HTM control circuit 100. The RTM control circuit 110 adds the new robot task to a robot task queue. The RTM control circuit 110 assigns tasks from the robot task queue to a robot of the plurality of robots that are coupled to the RTM control circuit 110. This process is described in more detail in regard to FIGS. 3 and 4.

The RTM control circuit 110 is coupled to at least one robot control circuit. In at least one aspect, the RTM control circuit 110 is coupled to multiple robot control circuits 116, 122. Each robot control circuit 116, 122 has a processor 118, 124 coupled to a memory 120, 126, respectively. In at least one aspect, each robot control circuit 116, 122 includes multiple processors and/or memories. The robot control circuits 116, 122 control a robot to perform tasks that are assigned to the robot by the RTM control circuit 110. In one aspect, the RTM control circuit 110 assigns one task at a time to each robot. In an alternative aspect, the RTM control circuit 110 assigns multiple tasks at once to each robot.

Figure 2:
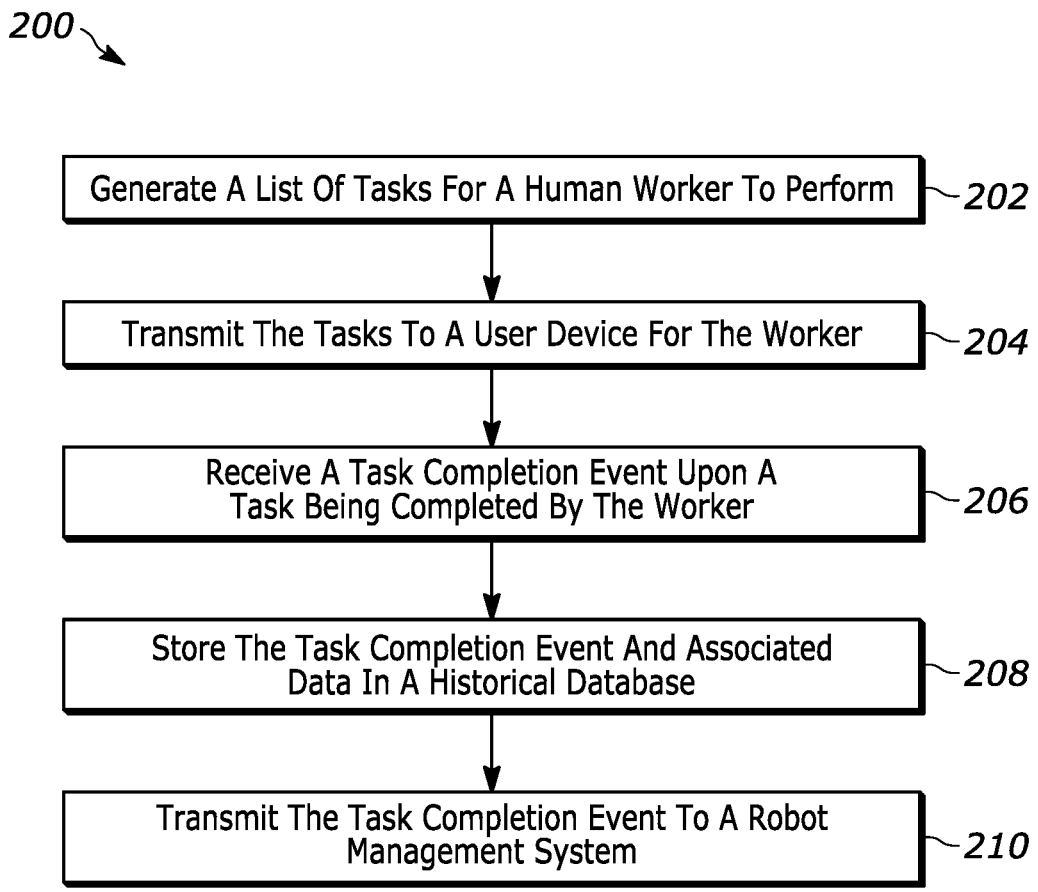
FIG. 2 is a flowchart illustrating a method that can be executed by a control circuit, according to at least one aspect of the present disclosure.

FIG. 2 is a flowchart depicting steps of a method 200 that can be executed by the HTM control circuit 100, according to at least one aspect of the present disclosure. The HTM control circuit 110 can perform more than the processes shown in the method 200. For the sake of brevity, not every process the HTM control circuit can perform is described. The method 200 includes generating 202 a list of tasks for a human worker to perform. The method 200 further includes transmitting 204 the list of tasks to a user device, e.g. user device 106, for the worker. In at least one aspect, the HTM control circuit 100 transmits the list of tasks to the user device 106. The method 200 further includes receiving 206 a task completion event upon a task being marked as completed by the worker on the user device. In at least one aspect, the worker can operate the user device 106 to mark a task as completed. Upon the task being marked as completed, the user device 106 can transmit to the HTM control circuit 100 a completion event for the task. The method 200 further includes storing 208 the task completion event and associated data in a historical database, e.g. historical database 128. The method 200 further includes transmitting 210 the task completion event to a RTM system, e.g. RTM control circuit 110. In at least one aspect, the task completion event includes a worker task ID and a worker ID.

A RTM system can be used to control and manage the tasks being performed throughout a facility. The RTM system can be used to control a variety of robots such as robots that are fixed in one location and mobile robots. The RTM system typically manages multiple activities for a plurality of robots by developing an activity queue to be allocated to various robots of the plurality. The RTM system maintains data on the robots that it is managing. In at least one aspect, the data includes a robot ID, the capabilities of the robot, and a current location of the robot within the facility. In at least one aspect, the capabilities of the robots include movement speed, lifting strength, number of bins, and installed sensors. In at least one aspect, the installed sensors include cameras, RFID scanners, inertial measurement unit (IMU) sensors, LiDAR scanners or other sensors to extract depth information, etc. As work activity within the facility fluctuates over time there may be times when every robot is completing an activity, and other times when some of the robots are idle. During a time when a robot is idle the cost for that robot to complete an additional job may be very low, such that the benefit of assigning an additional job outweighs the option of allowing the robot to remain idle.

Figure 3:
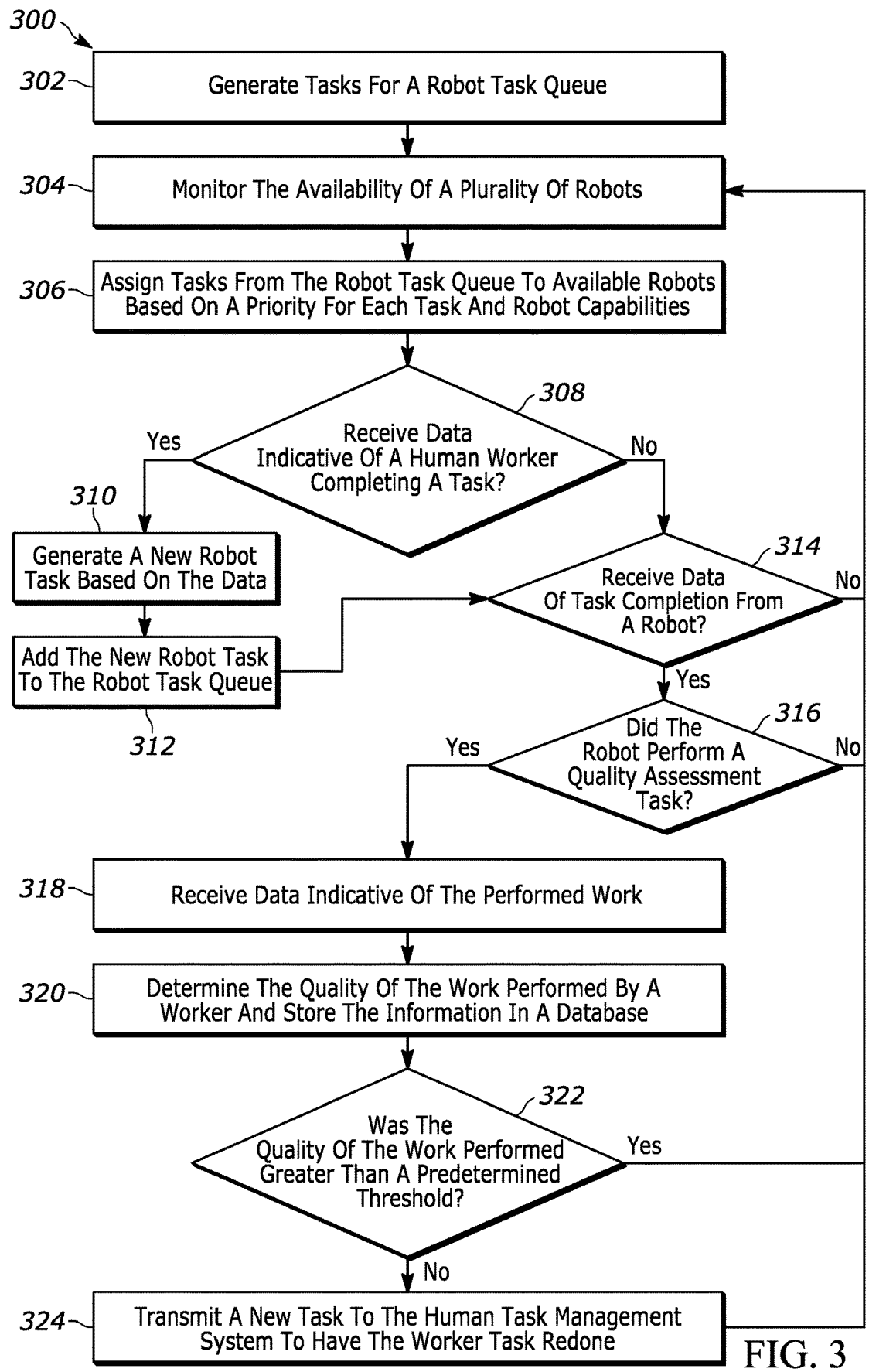
FIG. 3 is a flowchart illustrating a method that can be executed by a control circuit, according to at least one aspect of the present disclosure.

FIG. 3 is a flowchart depicting steps of a method 300 that can be executed by the RTM control circuit 110, according to at least one aspect of the present disclosure. The RTM control circuit 110 can perform more than the processes shown in the method 300. For the sake of brevity, not every process the RTM control circuit can perform was described. The method 300 includes generating 302 tasks for a robot task queue. For example, the robot task queue includes all the tasks that need performed by the robots in a facility. Each task created for a robot has task data. In at least one aspect, the task data includes a robot task ID, robot task type, location or zone of the task, a task benefit value, capabilities required by the robot, and any other information related to the task. For example, in regard to a quality assessment task, the task data can further include a worker task ID and worker ID. The method 300 further includes monitoring 304 the availability of a plurality of robots. For example, the RTM control circuit 100 can keep a log of the location of each robot and the task that each robot is performing. In some aspects, the RTM control circuit 100 also tracks a list of tasks that are assigned to each robot. The method 300 further includes assigning 306 tasks from the robot task queue to available robots based on a priority for each task and robot capabilities. In at least one aspect, the RTM control circuit 110 executes the method 400 (as shown in FIG. 4) to assign a task to a robot as described in further detail below.

Figure 4:
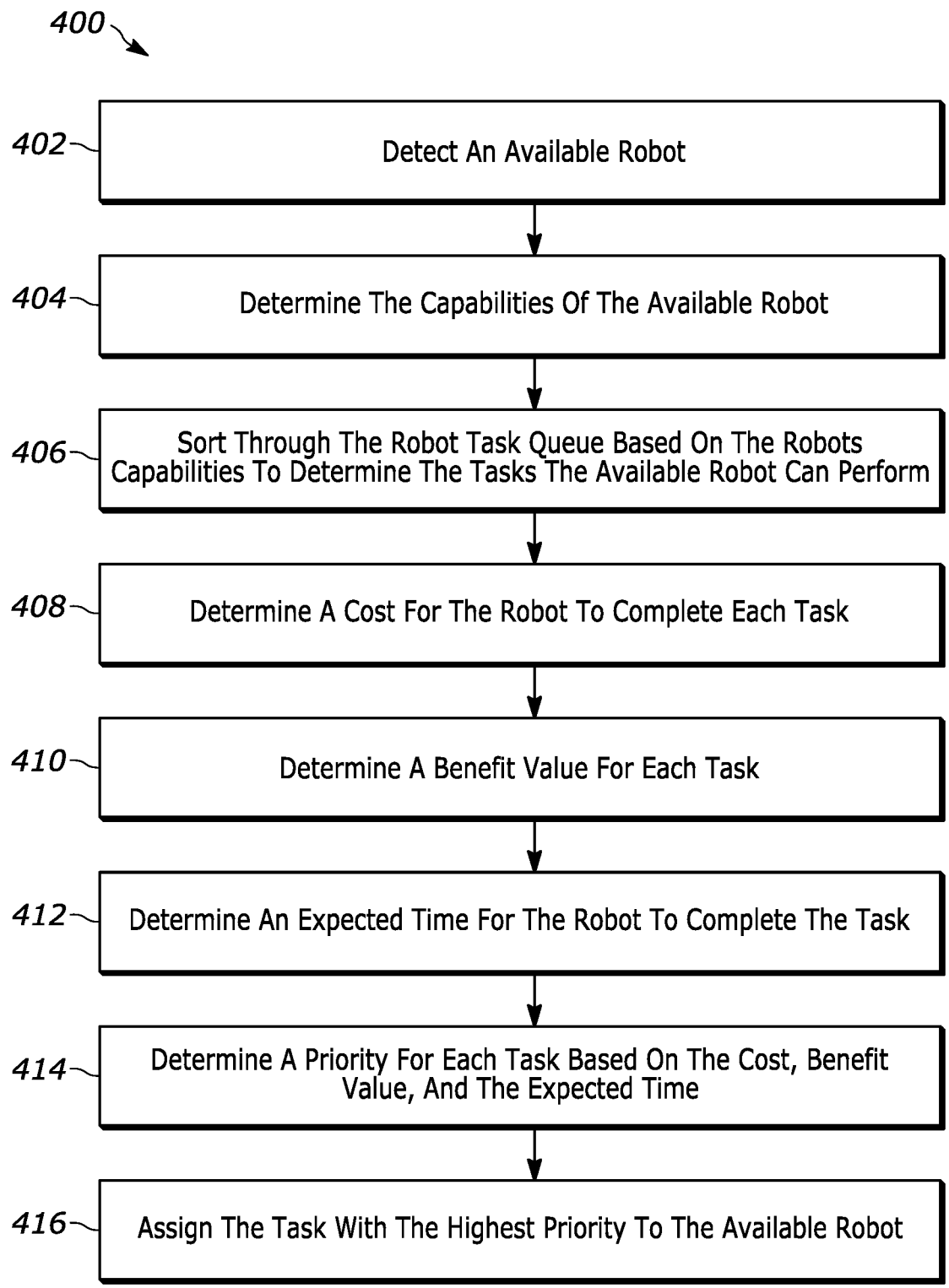
FIG. 4 is a flowchart illustrating a method that can be executed by a control circuit to assign a task to a robot, according to at least one aspect of the present disclosure.

FIG. 4 is a flowchart depicting steps of a method 400 that can be executed by the RTM control circuit 110 to assign a task to a robot, according to at least one aspect of the present disclosure. The method 400 includes detecting 402 an available robot. In one aspect, an available robot is a robot that completed a task and requires a new task. In another aspect, an available robot is a robot that has available time to complete another task based on an expected completion time for each task on the robot's task list. For example, another task could be added to a robot's task list due to the task happening close to the robots current location, which could make the expected time of completion short. The method 400 further includes determining 404 the capabilities of the available robot. In one aspect, the RTM control circuit 110 receives the capabilities of the robot from the robot itself. In another aspect, the RTM control circuit 110 receives the capabilities of the robot from a databased. For example, the RTM control circuit 110 can use a robot ID to search a database for the capabilities of the robot corresponding to the robot ID.

The method 400 further includes sorting 406 through the robot task queue based on the robot's capabilities to determine the tasks that the available robot can perform. For example, the RTM control circuit 110 can filter through the tasks in the task queue to create a list of the tasks from the task queue that the available robot can perform. The method 400 further includes determining 408 a cost for the robot to complete each task the robot can perform. In at least one aspect, the cost can be based on the location of the job, the current location of the robot, the capabilities of the robot, and estimated time to complete the task. For example, the RTM control circuit 110 could assign a high cost to a task for a robot, where the task only requires a small number of capabilities. As another example, the RTM control circuit 110 could assign a high cost to a task that is located far from the robot's location and a low cost to a task that is located near the robot's location. As yet another example, if it is a time when the robot is expected to be busy, the RTM control circuit 110 could assign a high cost to a task with a long expected completion time. However if the robot is generally idle during this time, then the RTM control circuit 110 could assign a low cost to a task with a long expected completion time.

The method 400 further includes determining 410 a benefit value for the robot to complete each task the robot can perform. For example, the RTM control circuit 110 can assigned a higher benefit value to tasks that only that robot, or type of robot, can perform. In at least one aspect, the benefit value is based on a robot task type, a worker task type, a task difficulty rating associated with the worker task or the type of worker task, historical data indicating the success rate on tasks of that type by that worker, an importance associated with the worker task type, an importance associated with the robot task type, and robot capabilities. For example, a first task may be a pallet moving task and it may have a low benefit value for a robot that has many capabilities when the pallet moving task could be performed by many other robots in the facility. For example, a second task may have a moderate benefit value resulting from it being a quality assessment task type for an assembly type task completed by a worker 12, where historical data shows assembly type tasks are completed successfully 97.2% of the time and that worker 12 has completed 184 of 185 assembly tasks correctly. For example, a third task may have a high benefit value resulting from it being a quality assessment task type for a picking type task completed by a worker 45 where historical data shows picking type tasks are completed successfully 88.1% of the time and that worker 45 has correctly completed 7 of 7 picking tasks.

The method further includes determining 412 an expected time for the robot to complete each task the robot can perform. For example, the RTM control circuit 110 can calculate the time it would take a robot to complete the task based on previous task completion times for the task, or task type, and the location of the robot relative to the location of the task. The method 400 further includes determining 414 a priority for each task the robot can perform. In at least one aspect, the priority for each task is based on the task cost, task benefit value, and expected time to complete the task. For example, there may be 3 tasks that a robot could perform in the robot task queue for a first robot with movement, lifting, and image capture capabilities. The tasks could be a pallet move task beginning 100 meters from the first robot, a first quality assessment task 120 meters from the first robot, and a second quality assessment task 10 meters from the first robot. The pallet move task may have a long expected time, a high benefit value, and a moderate cost. The first quality assessment task may have a moderate expected time, a low benefit value, and a moderate cost. The second quality assessment task may have a short expected time, a moderate benefit value, and a low cost. The RTM control circuit 110 may assign a high priority to the pallet move task, a low priority to the first quality assessment task, and a medium priority to the second quality assessment task.

The method 400 further includes assigning 416 the task with the highest priority to the available robot. Referring back to the example above, the RMS control circuit 110 would assign the pallet move task to the first robot, remove the pallet move task from the robot task queue, and leave the quality assessment task in the robot task queue for future consideration. For example, a second robot with lifting and image capture capabilities could complete an activity and the RTM control circuit 110 may then consider various jobs for the second robot. The second robot may be 20 meters from the first quality assessment task but 120 meters from the second quality assessment task. The RTM control circuit 110 may assign a medium priority to the first quality assessment task based on a low benefit value, short expected time, and low cost. The RTM control circuit 110 may assign a low priority to the second quality assessment task based on the moderate benefit value, the moderate expected time, and moderate cost. The RTM control circuit 110 would then assign the first quality assessment task to the second robot, remove the first quality assessment task from the robot task queue, and leave the second quality assessment task in the robot task queue for future consideration.

In some aspects, the RTM control circuit 110 executes the method 400 to assign multiple tasks in the task queue to the robots. For example, a first robot could be assigned two or more tasks from the task queue based on the determined priority. In one aspect, two or more tasks could be assigned to a robot if the tasks could be performed by the robot for a low cost and high benefit. For example, a robot could be performing a pallet move task and during movement of the pallet, the robot could perform a quality assessment task that is along the route the pallet needs moved.

In at least one aspect, the method 400 is applied to multiple available robots at the same time. For example, the capabilities for each robot can be determined by the RTM control circuit 110 and the robot task queue can be filtered based on the capabilities to create a list of tasks for each robot that can be performed that robot. Stated another way, a list of tasks can be created for each robot that corresponds to only tasks that the robot can complete. Then a cost, a benefit value, and an expected time of completion can be determined by the RTM control circuit 100 for each task on each task list. Then a priority for each task on each task list can be determined. The RTM control circuit 110 can then go through all the task lists, where each task list corresponds to a different robot, and assign the task with the highest priority overall first. The RTM control circuit 110 would then remove that task from all the task lists so that it could not be assigned twice. Then the RTM control circuit 110 would assign the task with the highest priority of the remaining tasks and so on. In some aspects, once a robot was assigned a task the RTM control circuit 110 would remove that robot's task list so that the robot was only assigned one task. In other aspects, this process can continue be used to assign all the tasks to the available robots. In this instance, once a robot was assigned a task, the expected time and expected location of the robot after the task was completed would be factored into the priority determination for any future task assignments. For example, the priority of a task that needed completed quickly would be low for a robot that is already completing a task that is expected to take a large amount of time to complete.

In some aspects, a robot is completing a task when it is reassigned to another task. For example, during an emergency situation such as locating an injured worker, the RTM control circuit 110 could reassign a robot a new task even if the robot is not available. In this situation, the robot would safely stop its current task and inform the RTM control circuit 110 of the progress made to the previous task it was working. Then the robot would begin performing the new task assigned to it by the RTM control circuit 110. In at least one aspect, the new task could be locating an injured worker in the facility due to an emergency injury notification.

The method 400 begins with the RTM control circuit 110 detecting an available robot, then filters through the tasks to find the tasks that the robot can perform, and then assigns the task with the highest priority to the available robot. An alternative method to assign a task to a robot begins with the RTM control circuit 110 detecting a task, filtering through the available robots to find the available robots that can perform the task, and then assigning the task to the robot that has the highest priority for the task. The alternative method is similar in many ways to method 400. For the sake of brevity the similarities between the method 400 and the alternative method will not be discussed in detail. The alternative method includes, the RTM control circuit 110 determining a task to assign from the robot task queue. For example, the RTM control circuit 110 can determine a task to assign based on the benefit value of the task or some other metric. The alternative method further includes, the RTM control circuit 110 determining the capabilities required for a robot to complete the task. For example, the required capabilities could be part of the task data when the task was created. The alternative method further includes, the RTM control circuit 110 filtering through the available robots based on the capabilities to find the available robots that could perform the task. The alternative method further includes, the RTM control circuit 110 determining a priority for the task in regard to each available robot that can perform the task. The priority is determined similar to method 400. The alternative method further includes, the RTM control circuit 110 assigning the task to the available robot with the highest priority for the task.

In regard to method 400 and the alternative method, in at least one aspect, the RTM control circuit 110 assigns all the tasks in the robot task queue to all the robots at once based on the determined priority and expected completion time for each task. In this way each robot has a task list that the robot is completing. In this aspect, the RTM control circuit 110 adjusts the assigned tasks between the robots based on task completion times being different than expected or based on new tasks entering the robot task queue.

In some aspects, it is desirable to limit the amount of time a certain robot, or a group of robots, spends on certain categories of tasks. For example, because robots with lifting capabilities may typically be needed for pallet move operations near the end of a shift, it may be desirable to limit robots with lifting capabilities to no more than a percentage, e.g. 10%, of their duty cycle to quality assessment tasks to maximize their availability and remaining battery charge for pallet move operations that have not yet been requested but may be reasonably anticipated. In at least one aspect, the RTM control circuit may store time data (start time, shift duration, elapsed times for completed activities, etc.) to monitor the remaining time allowable for a particular task category based on the limit, then compare an expected task time to the remaining time for establishing a priority for a task.

In some aspects, tasks of certain task categories may not be assigned a priority high enough for the task to be assigned to a robot by the RTM control circuit 110. In this aspect, the RTM control circuit 110 may periodically delete such tasks from the robot task queue, reassign the tasks to the HTM control circuit 100 or another process, or transmit an alert to a user device. For example, an alert could be transmitted to the user device of a manager for them to approve removal of the task. Such tasks may have an "optional parameter" to indicate the possibility that they may not be assigned and to differentiate them from other task categories that the RTM control circuit 110 may be required to assign to a robot.

Referring back to FIG. 3, after the RTM control circuit 110 assigns a task, or tasks, to a robot, or robots, the method 300 further includes determining 308 if data received was indicative of a worker competing a task. For example, the HTM control circuit 100 transmits a task completion event to the RTM control circuit 110 upon a worker completing a task, as described in regard to FIG. 2. If the data received was indicative of a worker completing a task, then the method 300 proceeds along the "yes" branch to generating 310 a new robot task, e.g. a quality assessment task, maintenance inspection, high value item inspection, or etc., based on the data received and historical data. For example, the data received can be used by the RTM control circuit 110 to query the historical database 128 for historical data. In some aspects, the data received includes a worker ID and a task ID. In some aspects, the historical data received from the historical database 128 includes a location or zone in the facility where the task was completed, an importance associated with the worker task, a worker task type, a task difficulty rating associated with the task or the task type, and historical data indicating the success rate on tasks of that type by that worker. In at least one aspect, the new robot task includes a robot task ID, robot task type, location or zone of the task, a task benefit value, and any other information related to the robot task. The method 300 further includes adding 312 the new robot task to the robot task queue. If the data received was not indicative of a worker completing a task, then the method 300 proceeds along the "no" branch.

Referring still to FIG. 3, the "yes" branch and the "no" branch both lead to the method 300 further including determining 314 if the data received was a task completion event from a robot. If the data received was not a task completion event from a robot, then the method proceeds along the "no" branch and returns to monitoring 304 the availability of a plurality of robots. If the data received was a task completion event from a robot, then the method 300 proceeds along the "yes" branch to determining 316 if the robot performed a quality assessment task. If the task completion event was not for a quality assessment task, then the method 300 proceeds along the "no" branch to monitoring 304 the availability of a plurality of robots. If the task completion event was for a quality assessment task, then the method 300 proceeds along the "yes" branch to receiving 318 data indicative of the performed work by the worker that completed the worker task.

Figure 5:
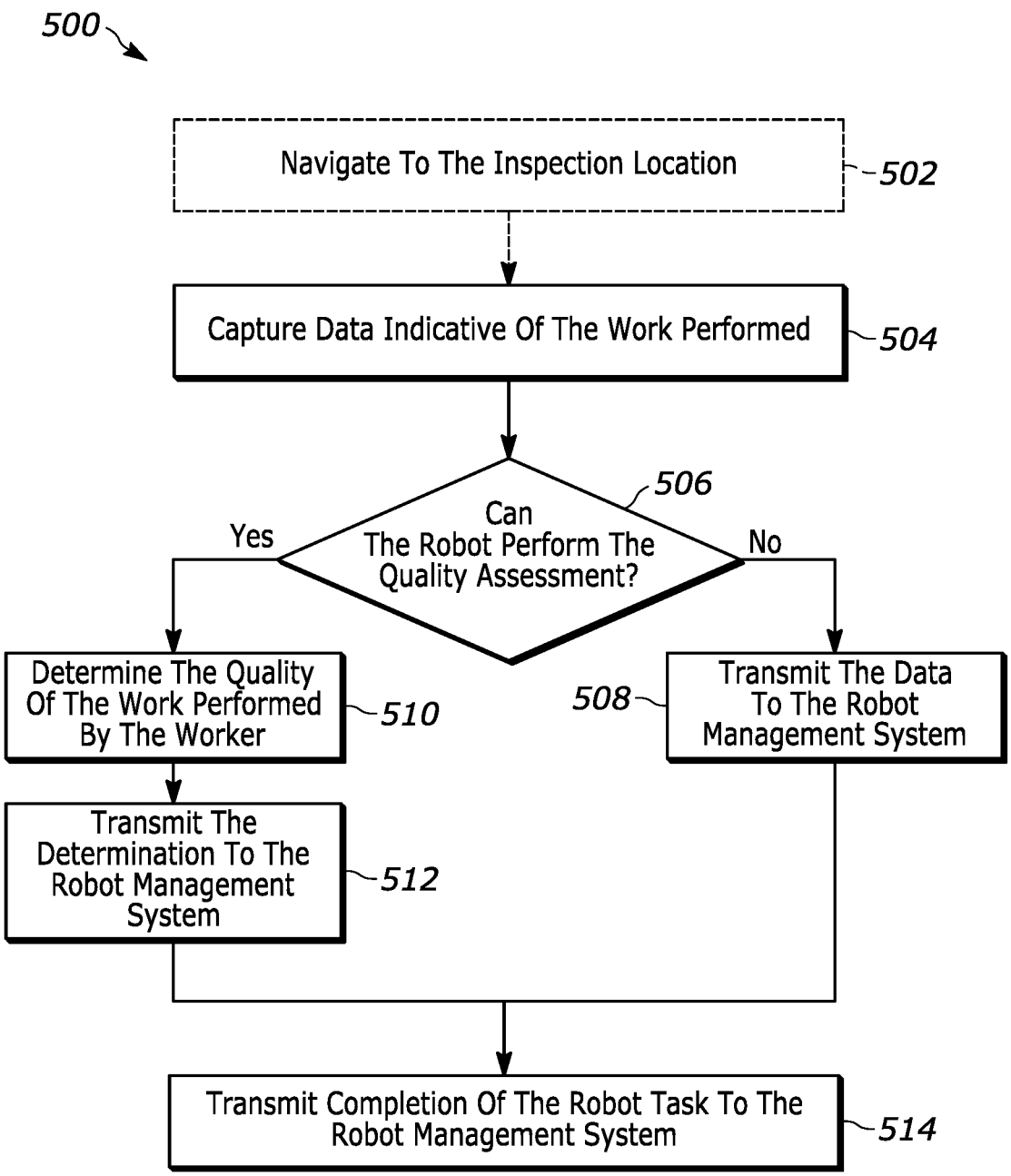
FIG. 5 is a flowchart illustrating a method that can be executed by a robot control circuit to control a robot to perform a quality assessment task, according to at least one aspect of the present disclosure.

FIG. 5 is a flowchart depicting steps of a method 500 that can be executed by a robot control circuit, e.g. robot control circuit 116 or robot control circuit 122, to control a robot to perform a quality assessment task, according to at least one aspect of the present disclosure. The method 500 includes navigating 502 to the inspection location. In at least one aspect, the robot has the capability to move from one location in the facility to another. In other aspects, the robot does not have to move to another location to perform the quality assessment task. The method 500 further includes capturing 504 data indicative of the work performed by the worker completing the worker task. In some aspects, the data could be image data, IMU data, gyroscope data, location data, orientation data, depth data, items in a bin, and/or etc. For example, in a picking task completed by a worker, the quality assessment data could be the items that were placed in a bin, where the robot gathered the data on items by performing RFID scans of each item in the bin. In another example, for an assembly task completed by a worker, the quality assessment data could be image data of the assembled component.

The method 500 further includes determining 506 if the robot can perform the quality assessment of the work performed. For example, the quality assessment could require analysis of image data that the processor on the robot cannot timely perform. If the robot can perform the quality assessment, then the method 500 proceeds along the "yes" branch to determining 510 the quality of the work performed by the worker. For example, for a quality assessment of a picking task, the robot control circuit could compare the item ID's of the items required to the item ID's of the items in a bin for shipment. The method 500 further includes transmitting the determination to the RTM control circuit 110. Referring to the example above, the robot control circuit would transmit the success or failure of the worker to place the correct items in the bin. If the robot cannot perform the quality assessment of the data, then the method 500 proceeds along the "no" branch to transmitting 508 the data to the RTM control circuit 110. For example, the robot may transmit image data that needs analyzed to the RTM control circuit 110. After the robot transmits data related to the quality assessment to the RTM control circuit 110, the method 500 further includes transmitting 514 a completion event of the robot quality assessment task to the RTM control circuit 110.

Referring back to FIG. 3, in some aspects, the quality assessment data received by the RTM control circuit 110 is a determination of the success or failure of the worker to perform the worker task. In other aspects, the quality assessment data could need analyzed. In at least one aspect, the quality assessment data is captured image data that needs analyzed. The quality assessment data could be analyzed by the RTM control circuit directly, it could be sent to a separate system to be analyzed, or it could be sent to a user device to be analyzed by a human. For example, the RTM control circuit 110 may allocate a quality assessment task to a robot based on a worker completing an assembly task. The robot then captures image data of an assembled component and transmits the image data to the RTM control circuit 110 so that a machine vision system may confirm all screws have been properly inserted. In at least one aspect, the machine vision system is part of the RTM control circuit 110. In another aspect, the machine vision system is a separate system connected to the RTM control circuit 110. In yet another aspect, the RTM control circuit 110 transmits the image data to a user device for a human to analyze.

Referring still to FIG. 3, the method 300 further includes determining 320 the quality of the work performed by the worker and storing the information in the historical data base 128. Referring to the example above, the RTM control circuit 110 determines, or receives, that the component was properly assembled or improperly assembled and stores the assessment data related to the completed task in the historical database 128, such as storing the task ID, worker task type, worker ID and a successful or unsuccessful completion. For a successful completion, the RTM control circuit 110 stores a successful completion and, in at least one aspect, increments a record stored in the historical database 128 to indicate both the number of completed tasks, or task of a task type, by the worker and the number of successfully completed tasks, or tasks of a task type, by the worker has increased by one. For an unsuccessful completion, the RTM control circuit 110 stores an unsuccessful completion and, in at least one aspect, increments a record stored in the historical database 128 to indicate that the number of completed tasks, or tasks of a task type, has increased by one but that the number of successfully completed tasks, or tasks of a task type, has remained unchanged. This determination data may subsequently be used to determine task benefit value when creating a task for a robot as explained above in regard to FIG. 4. In at least one aspect, the task benefit value may be based on a worker task type, robot task type, historical data indicating the success rate on tasks of that type by that worker, or other metrics determined from the determination data.

The method 322 further includes determining 322 if the quality of the work performed was greater than or equal to a predetermined threshold, or predetermined standard. In at least one aspect, the threshold, or standard, can be based on the type of task performed by the worker. For example, in an assembly task where a component is attached to another component with 8 screws, the threshold could be the locations of the 8 screws attaching the components being in the proper areas. As such if one of the screws is missing, then the quality of the work performed was below the threshold. As another example, if the task was a picking task, then the threshold could be that all the correct items were placed in the correct bin. If the RTM control circuit 110 determines that the worker task was performed successfully, then the method 300 proceeds along the "yes" branch back to monitoring 304 the availability of a plurality of robots. If the RTM control circuit 110 determines that the worker task was performed unsuccessfully, then the method 300 proceeds along the "no" branch to transmit a new task to the HTM control circuit 100 to have the worker task corrected.

In at least one aspect, the RTM control circuit 110 can generate a new task based on the transmitted rework task sent to the HTM control circuit 100. For example, if a worker assembly task was unsuccessful, the RTM control circuit 110 can transmit a rework task including a workstation for an assembly to be fixed to the HTM control circuit 100 and then create a new robot task to move the assembly to the workstation for it to be properly reassembled.

Figure 6:
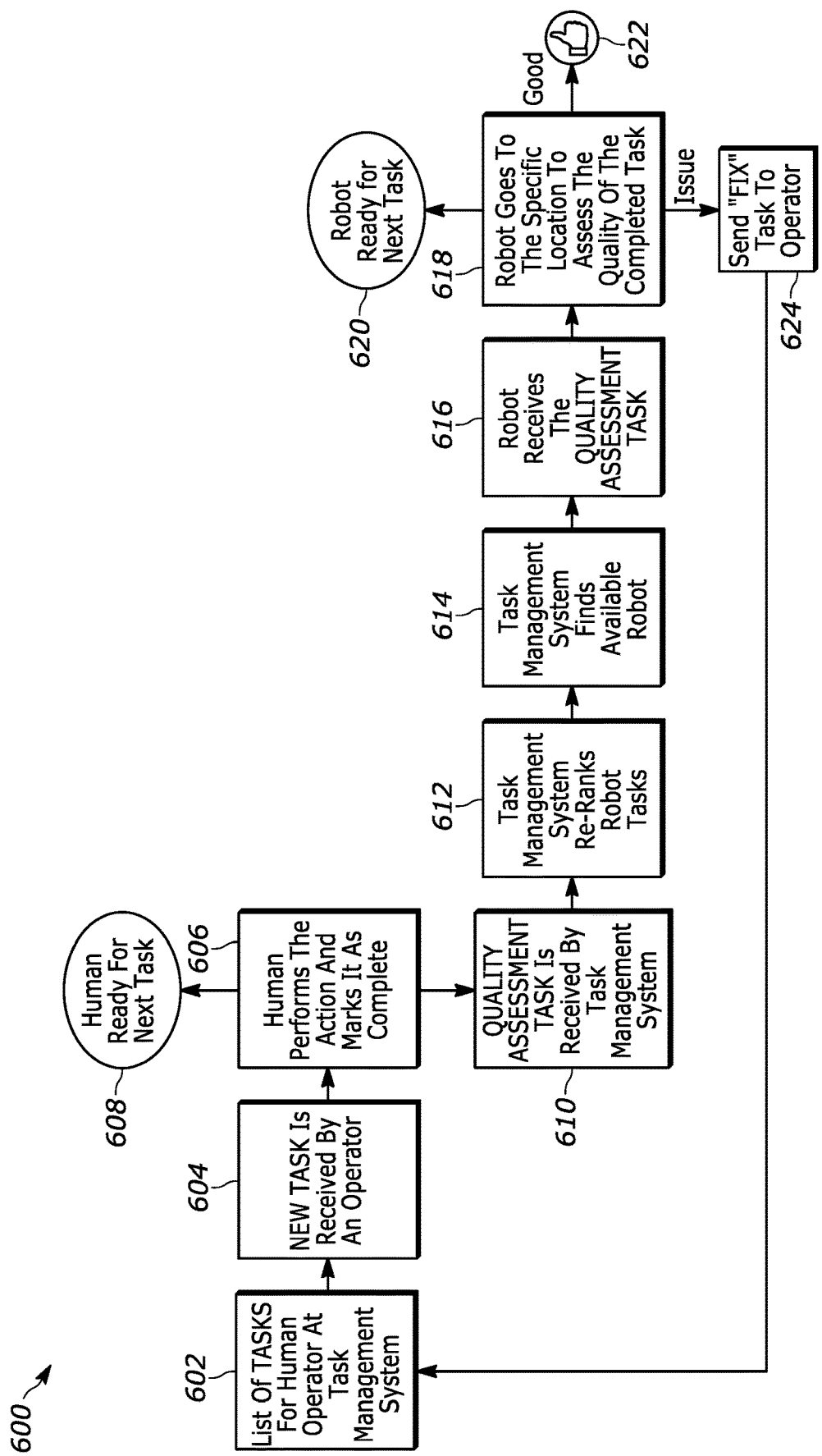
FIG. 6 is a flowchart illustrating an example work flow of a quality assessment task being assigned to a robot and completed by the robot, according to at least one aspect of the present disclosure.
Figure 7:
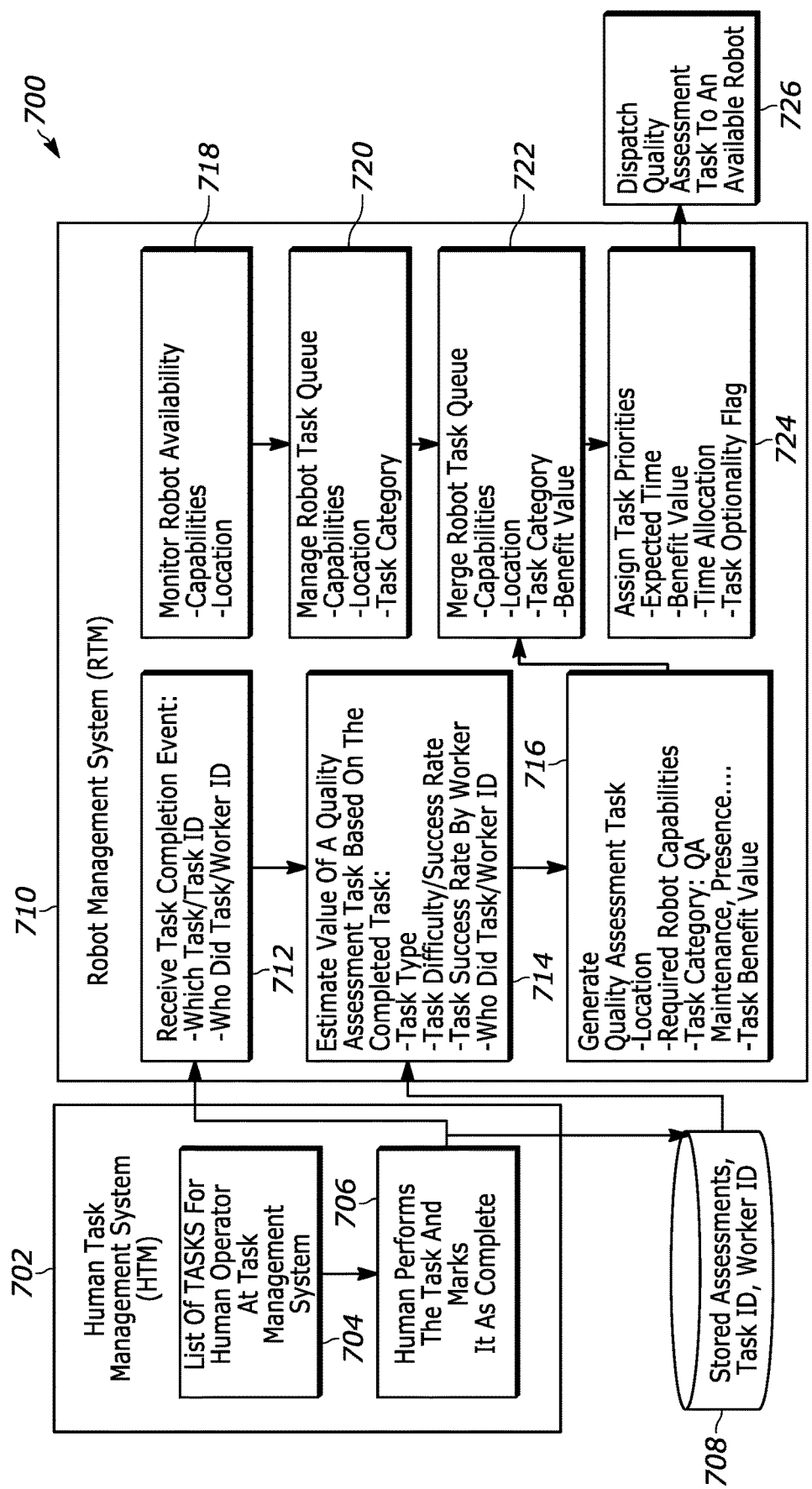
FIG. 7 is a flowchart illustrating an example process of a quality assessment task being assigned to a robot, according to at least one aspect of the present disclosure.
Figure 8:
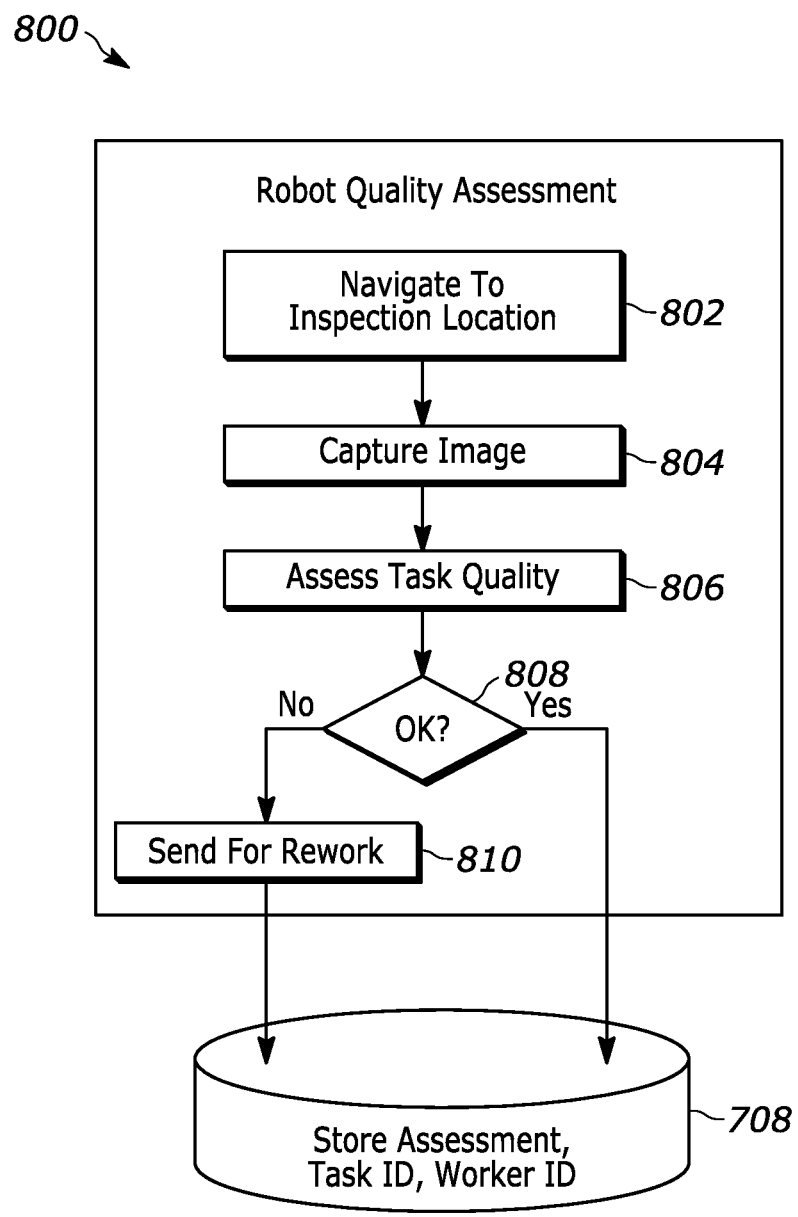
FIG. 8 is a flowchart illustrating an example process of a robot completing a quality assessment task, according to at least one aspect of the present disclosure.

FIGS. 6-8 describe an example of a robot being assigned a quality assessment task and the robot performing the task. The process is similar to and in some aspects uses the methods described in regard to FIGS. 1-5. For the sake of brevity, not all similarities will be described in detail. FIG. 6 is a flowchart illustrating an example work flow 600 of a quality assessment task being assigned to a robot and completed by the robot, according to at least one aspect of the present disclosure. FIG. 7 is a flowchart illustrating an example process 700 of a quality assessment task being assigned to a robot, according to at least one aspect of the present disclosure. FIG. 8 is a flowchart illustrating an example process 800 of a robot completing a quality assessment task, according to at least one aspect of the present disclosure.

Referring to FIG. 6, the HTM system, e.g. HTM control circuit 100, generates 602 a list of tasks for human operators to complete. Then, a new task is received 604 by an operator. The human operator performs 606 the action and marks it as completed. After that, the human operator is ready 608 to perform another task. The HTM system transmits 610 a completion event for the work performed to the RTM system, e.g. RTM control circuit 110, and the RTM system creates a quality assessment task of the human operators work. The RTM system re-ranks 612, or reorders, the robot tasks based on priority. Then, the RTM system detects 614 an available robot. That robot is then assigned 616 the quality assessment task. The robot goes 618 to the location to perform the quality assessment task. If the quality of the work performed is equal to or above a threshold, then the robot reports 622 that the human operator successfully completed their task. If the quality of the work performed was below the threshold, then the robot reports 624 that the human operator was not successful at completing their task and sends a fix request so that the HTM system can have another operator correct the task. After the robot performs the quality assessment task, the robot is ready 620 for their next task.

Referring to FIG. 7, the example process 700 begins with the HTM system 702, e.g. HTM control circuit 100, generating 704 a list of tasks for human operators to complete. The HTM system 702 receives a notification that a human operator completed an assigned task. When the HTM system 702 receives the notification, it creates an HTM completion event that includes the Task ID and the ID of the Human worker who completed the Task. The HTM system 702 transmits the HTM completion event to the RTM system 710, e.g. RTM control circuit 110, and stores the HTM completion event and associated data in the database 708, e.g. historical database 128.

The RTM system 710 monitors 718 the availability of the robots in a facility and manages 720 the robot task queue. For example, the robot task queue has all of the tasks that need assigned to a robot. The RTM system records the capabilities of the robots, locations of the robots, and locations of the tasks. The RTM system 710 receives 712 the HTM completion event from the HTM system 702. The RTM system 712 estimates 714 a benefit value of a quality assessment task based on the HTM completion event. In some aspects, the RTM system 712 uses the data in the HTM completion event to access additional data related to the human operator task from the database 708. For example, the RTM system 712 can receive a task type, task difficulty, task success rate by the worker for tasks of that type, a location where the quality assessment task needs performed. The RTM system 710 generates 716 a quality assessment task for a robot. The quality assessment task includes a location for the quality assessment, required robot capabilities, a worker task category, and a task benefit value. The RTM system 702 adds 722 the quality assessment task to the robot task queue so that the quality assessment task can be assigned to an appropriate robot. For example, when a robot has completed an activity, the RTM system 702 filters the robot task queue down to the tasks suitable for the robot based on the capabilities of the robot. The RTM system 702 then estimates a cost for the robot to complete each task based on various factors, such as location of the job, the current location of the robot, expected completion time, and the capabilities of the robot.

The RTM system 702 then assigns 724 a priority for each task for the robot based on the benefit value and the cost. Then the RTM system assigns the task with the highest priority to the robot. If there are multiple available robots, then the RTM system 702 can assign a priority for each task to all the robots. The RTM system 702 can then determine the robot with the highest priority task and assign that task to that robot. The RTM system 702 assigns 726 the quality assessment task to an available robot.

Referring to FIG. 8, the example process 800 begins with the robot navigating 802 to the inspection location. At the inspection location, the robot captures 804 image data of the work performed by the human operator from a field of view. The robot, or another system, assesses 806 the task quality. For example, the robot can provide the captured image data to an analysis system to assess the quality of the completed task. The task quality is transmitted to the RTM system 702. If the task quality was equal to or above a threshold, then the RTM system 702 to stores the success in the database 708. If the task quality was below the threshold then the RTM system 702 to stores the failure in the database 708 and transmits 810 a notification to the HTM system 702 that the human operator task needs corrected. The HTM system 702 then generates a new operator task to correct the incorrectly completed task.

In the foregoing detailed description, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the terms "component," "system," "module" and the like can refer to a computer-related entity, either hardware, a combination of hardware and software, software, or software in execution.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A robot management system comprising:
    a control circuit configured to:
        receive a completion event from a human task management system coupled to the robot management system, the completion event being indicative of a worker task being completed by a human without a robot and having first data comprising a human worker identification number and a worker task identification number;
        generate a new robot task based on the first data;
        add the new robot task to a robot task queue;
        detect a first available robot;
        determine capabilities of the first available robot;
        filter the robot task queue based on the capabilities of the first available robot to generate a first group of robot tasks, the first group being a subset of the robot task queue and each task in the first group can be performed by the first available robot;
        determine a first priority group comprising a priority for the first available robot for each task in the first group; and
        assign a robot task from the first group to the first available robot based on the first priority group.

2. The robot management system of claim 1, wherein to determine the first priority group comprising a priority for the first available robot for each task in the first group, the control circuit is further configured to:
    determine a cost for each task of the first group;
    determine a benefit value for each task of the first group;
    determine an expected time of completion for each task of the first group; and
    determine the priority for each task of the first group based on the cost, the benefit value, and the expected time of task completion.

3. The robot management system of claim 2, wherein the benefit value is based on at least one of a task type, a task difficulty, historical data of a work quality of the human worker, importance of the task, or a combination thereof.

4. The robot management system of claim 1, wherein the robot task is a first robot task, and wherein the control circuit is further configured to assign a second robot task to the first available robot, wherein the second robot task is a quality assessment task, and wherein the quality assessment task is completed during the process of completing the first robot task.

5. The robot management system of claim 1, wherein the robot task is a quality assessment task.

6. The robot management system of claim 5, wherein the control circuit is further configured to:
    receive second data indicative of performed work associated with the worker task from the available robot;
    determine, based on the second data, whether a quality of the performed work is greater than or equal to a threshold; and
    store the first data and the determination in a historical database.

7. The robot management system of claim 6, wherein the control circuit is further configured to transmit a new task to the human task management system indicative of a request to correct the performed work associated with the worker task based on the quality of the performed work being less than the threshold.

8. The robot management system of claim 5, wherein the control circuit is further configured to:
    receive a determination on whether a quality of performed work associated with the worker task is greater than or equal to a threshold from the first available robot; and
    store the first data and the determination in a historical database.

9. The robot management system of claim 8, wherein the control circuit is further configured to transmit a new task to the human task management system indicative of a request to correct the performed work associated with the worker task based on the quality of the performed work being less than the threshold.

10. The robot management system of claim 1, wherein to generate the new robot task based on the first data, the control circuit is further configured to:
    receive task data based on the first data, wherein the task data comprises a worker task type, a task difficulty, a success rate by the worker for that worker task type, and a location where the worker task was performed;
    determine a set of capabilities required by a robot to perform the new robot task; and
    determine a benefit value for the new robot task based on the task data.

11. The robot management system of claim 1, wherein the control circuit is further configured to:
    detect a second available robot;
    determine capabilities of the second available robot;
    filter the robot task queue based on the capabilities of the second available robot to generate a second group of robot tasks, the second group being a subset of the robot task queue and each task of the second group can be performed by the second available robot;
    determine a second priority group comprising a priority for the second available robot for each task in the second group; and assign the robot task from the first group to the first available robot based on the first priority group and the second priority group.

12. The robot management system of claim 11, wherein the robot task is assigned to the first group and the second group, and wherein the control circuit is further configured to:
   remove the robot task from the second group and the priority for the robot task from the second priority group; and
   assign a second robot task from the second group to the second available robot based on the second priority group.

13. The robot management system of claim 1, wherein the robot task is a quality assessment task and wherein the control circuit is further configured to:
   receive second data indicative of performed work associated with the worker task from the available robot;
   determine, based on the second data, whether a quality of the performed work is greater than or equal to a threshold; and
   store the first data and the determination in a historical database.

14. The robot management system of claim 13, wherein the control circuit is further configured to transmit a new task to the human task management system indicative of a request to correct the performed work associated with the worker task based on the quality of the performed work being less than the threshold.

15. A non-transitory computer readable medium storing computer readable instructions which, when executed cause a machine to:
   receive a completion event indicative of a human worker completing a worker task without a robot, the completion event having first data comprising a human worker identification number and a worker task identification number;
   generate a new robot task based on the first data;
   add the new robot task to a robot task queue;
   detect an available robot;
   determine capabilities of the available robot;
   filter the robot task queue based on the capabilities of the available robot to generate a group of robot tasks, the group of robot tasks being a subset of the robot task queue and each task in the group of robot tasks can be performed by the available robot;
   determine a priority group for the available robot for each task in the group of robot tasks; and
   assign a robot task from group of robot tasks to the available robot based on the priority group.

16. The non-transitory computer readable medium of claim 15, wherein the computer readable instructions, when executed, cause the machine to determine a priority group for the available robot for each task in the group of robot tasks by
   determining a cost for each task;
   determining a benefit value for each task;
   determining an expected time of completion for each task; and
   determining the priority for the available robot for each task based on the cost, the benefit value, and the expected time of task completion.

17. The non-transitory computer readable medium of claim 15, wherein the computer readable instructions, when executed, cause the machine to generate the new robot task based on the first data by
   receiving task data based on the first data, wherein the the task data comprises a worker task type, a task difficulty, a success rate by the worker for that worker task type, and a location where the worker task was performed;
   determining a set of capabilities required by a robot to perform the new robot task; and
   determining a benefit value for the new robot task based on the task data.

18. The non-transitory computer readable medium of claim 15, wherein the robot task is a quality assessment task and wherein the computer readable instructions, when executed, further cause a machine to:
   receive second data indicative of performed work associated with the worker task from the available robot;
   determine, based on the second data, whether a quality of the work performed is greater than or equal to a threshold; and
   store the first data and the determination in a historical database.

19. The robot management system of claim 18, wherein the computer readable instructions, when executed, further cause a machine to: transmit a new worker task indicative of a request to correct the performed work associated with the worker task based on the quality of the performed work being less than the threshold.

20. A robot management system, comprising:
   a control circuit configured to:
      receive a completion event from a human task management system coupled to the robot management system, the completion event being indicative of a worker task being completed by a human worker without a robot and having first data comprising a human worker identification number and a worker task identification number;
      generate a new robot task based on the first data;
      add the new robot task to a robot task queue;
      determine a task to assign;
      determine the robot capabilities required to perform the task;
      filter the robots in the facility based on the required capabilities to determine a group of robots that can perform the task, the group of robots being a subset of the robots in the facility;
      determine a priority group comprising a priority for the task for each robot in the group of robots; and
      assign a robot from the group of robots the task based on the priority group.

* * * * *